United States Patent [19]

Yajika et al.

[11] Patent Number: 5,103,436
[45] Date of Patent: Apr. 7, 1992

[54] TILT SERVO DEVICE IN OPTICAL DISC PLAYER

[75] Inventors: Kazuo Yajika; Katsumi Kawamura, both of Saitama, Japan

[73] Assignee: Pioneer Electronic Corporation, Tokyo, Japan

[21] Appl. No.: 355,259

[22] Filed: May 19, 1989

[30] Foreign Application Priority Data

Oct. 31, 1988 [JP] Japan .................. 63-275260

[51] Int. Cl.⁵ .................................................. G11B 7/00
[52] U.S. Cl. .................... 369/32; 369/44.35
[58] Field of Search ............... 369/44.32, 27, 29, 36, 369/35; 360/78.05, 78.04

[56] References Cited

U.S. PATENT DOCUMENTS

| | | | |
|---|---|---|---|
| 4,607,357 | 8/1986 | Okano | 369/44.32 |
| 4,608,680 | 8/1986 | Yano | 369/44.32 |
| 4,637,005 | 1/1987 | Naito et al. | 369/44.36 |
| 4,703,468 | 10/1987 | Baba et al. | 369/44.32 |
| 4,707,817 | 11/1987 | Yoshio | 369/44.32 |
| 4,736,354 | 4/1988 | Yoshio | 369/44.35 |

OTHER PUBLICATIONS

Japanese Utility Model App. No. 27231/1988.

*Primary Examiner*—Roy N. Envall, Jr.
*Assistant Examiner*—Hindi Nabil
*Attorney, Agent, or Firm*—Sughrue, Mion, Zinn, Macpeak & Seas

[57] ABSTRACT

Optical disk player with tilt servo including means wherein the transfer frequency characteristic of a feedback circuit for controlling a tilt adjust mechanism is changed to a wide bandwidth transfer characteristic while in a search operation mode, and is changed to a narrow bandwidth transfer characteristic while in a play operation mode. Accordingly, the transfer frequency characteristic of the feedback circuit in the tilt servo system is changed according to the operation mode of the disk player, so that a suitable loop characteristic is selected for the tilt servo system.

8 Claims, 3 Drawing Sheets

TILT SERVO DEVICE IN OPTICAL DISC PLAYER

TECHNICAL FIELD OF THE INVENTION

This invention relates to a tilt servo device for optical disk players.

BACKGROUND OF THE INVENTION

An optical disk player employs a tilt servo device (in order to reduce cross talk) which automatically operates to control the relative position of an optical disk (hereinafter referred to merely as "a disk" when applicable) and a pickup so as to apply a data reading light beam perpendicularly to the recording surface of the disk. One example of the tilt servo device has been disclosed by Japanese Utility Model Application No. 27231/1988.

A tilt servo device comprises: a tilt sensor for providing a tilt error signal indicating the inclination of a disk: a servo amplifier for amplifying the tilt error signal; a tilt servo motor for generating a drive in a forward or reverse direction according to the output of the servo amplifier; and a tilt adjusting mechanism for performing tilt adjustment with the aid of the drive thus generated.

A related tilt servo device of this type will be described with reference to FIG. 4.

As shown in FIG. 4, a tilt sensor 1 is made up of a light emitting element LED; and two light receiving elements $PD_1$ and $PD_2$ arranged radially with respect to a disk 20 in such a manner they are positioned on both sides of the light emitting element LED. A light beam emitted by the light emitting element LED is reflected from the recording surface of the disk 20 and received by the light receiving elements $PD_1$ and $PD_2$. The quantity of light received by each of the light receiving elements changes with the tilt angle of the disk 20. The difference between the quantities of light received by the light receiving elements is input to an inverting phase input terminal of an equalizer amplifier 2, with this difference signal being referenced as the tilt error signal.

The equalizer amplifier 2 comprises: an operational amplifier $OP_1$; resistors $R_{21}$ and $R_{22}$ connected to the inverting phase input terminal of the operational amplifier $OP_1$, thus forming an input circuit: and resistors $R_{23}$ and $R_{24}$ and a capacitor $C_{21}$ connected between the inverting phase input terminal and the output terminal of the operational amplifier, thus forming a feedback impedance circuit. The capacitor $C_{21}$ functions electrically to disconnect the resistor $R_{23}$ at low frequencies. Therefore the frequency characteristic of the equalizer amplifier 2 has two break points $f_2$ and $f_3$; for instance the break point $f_2$ is 10 Hz, and the break point $f_3$ is 280 Hz.

The output of the equalizer amplifier 2 is applied through a relay switch 3 to another equalizer amplifier 4. The relay switch 3 is operated under the control of a control section 5 comprising for instance a microprocessor. For instance when no disk is loaded or the pickup is located at the innermost or outermost periphery of the disk 20, the relay switch 3 is opened to eliminate the difficulty that external light or the mirror surface of the disk cause the tilt sensor to output erroneous outputs: that is, it functions to prevent the erroneous operation of the tilt sensor. The relay switch 3 is kept closed while the device is in a search operation mode (described later). When the relay switch 3 is opened, no tilt adjustment is carried out.

The equalizer amplifier 4 comprises: an operational amplifier $OP_2$; a resistor $R_{41}$ connected to the inverting phase input terminal of the operational amplifier $OP_2$, thus forming an input circuit; and a parallel circuit of a resistor $R_{42}$ and a capacitor $C_{41}$ which is connected between the inverting phase input terminal and the output terminal of the operational amplifier $OP_2$ thus forming a feedback impedance circuit. The equalizer amplifier 4 serves as a low-pass filter (hereinafter referred to as "an LPF", when applicable), and its output is decreased at a rate of 6 dB/Oct beginning with a frequency $f_1$ which is for instance 0.5 Hz.

The output of the equalizer amplifier 4 is applied through a resistor $R_{61}$ to a tilt drive circuit 6. The tilt drive circuit 6, comprising a pair of complementary output transistors 62 and 63, applies a forward or reverse current to a tilt servo motor 7 according to the output of the equalizer amplifier 4. The tilt servo motor 7 drives tilt adjustment mechanism (not shown) to perform tilt control. The equalizer amplifiers 2 and 4 and the tilt drive circuit 6 form a feedback circuit.

A read pickup (not shown) applies a light beam to the disk 20 and subjects the light beam reflected therefrom to electric conversion to form a read signal (hereinafter referred to as "an RF signal", when applicable). The RF signal is applied to address detecting means, namely, a data demodulating circuit 8. The circuit 8 separates control data such as for instance an address signal from the RF signal and applies it to a control section 5. A variety of instruction signals, such as a performance instruction and a search instruction, are applied to the control section 5 with a key board 9. The control section 5 provides a control output according to a control program stored in advance, in response to the control data and the instruction signal. For instance when a search instruction is produced with the key board 9, the distance between a present address supplied by the data demodulating circuit 8 and a target address specified is calculated, and a carriage drive instruction signal having a width corresponding to the distance thus calculated is applied to a carriage drive circuit 10. The carriage the carriage drive circuit 10, is applied to a carriage motor 11. As a result, a pickup carriage (not shown) adapted to position the pickup radially with respect to the disk is moved to effect the target address. Thereafter, the control section 5 operates a tracking servo (not shown) and calculates the difference in distance between the target address and the present address which is obtained from the RF signal after the tracking servo loop is locked in. The control section 5 repeatedly issues an instruction signal for a track jumping operation corresponding to the difference in distance thus calculated, and then outputs an instruction signal for a play mode when the present address approaches the target address. Thus, the search operation mode is ended. After the search operation mode, a play operation mode for the ordinary disk performance is effected. In the play operation mode, the carriage drive circuit 10 drives the carriage motor 11 when an error signal in a tracking servo system (not shown) increases in level.

The transfer frequency gain characteristic of the equalizer amplifiers 2 and 4 is shown in FIG. 5.

In the characteristic shown in FIG. 5, the frequencies $f_1$, $f_2$ and $f_3$ of the three break points are 0.5 Hz, 10 Hz and 280 Hz, respectively. The gain is the highest between DC (0 Hz) and the frequency $f_1$, and it decreases with 6 db/Oct between frequencies $f_1$ and $f_2$, and it decreases with 12 dB/Oct between the frequencies $f_2$ and $f_3$.

The reason why the total transfer characteristic of the equalizer amplifiers is of a narrow bandwidth as described above is that it is essential to minimize the tilt angle of the disk and to stabilize the tilt servo loop.

In a search operation in which, upon specification of a performance start address, search is made between the inner and outer peripheries of the disk, and the performance is started from the address thus specified, it is essential to maintain the picture quality unchanged immediately after the search operation, to suppress the erroneous counting of cross tracks, to stabilize the multi-track jumping operation, and to suppress the defocusing phenomenon in which the focusing servo cannot achieve its follow-up operation satisfactorily.

However, in the ordinary play operation, the transfer characteristic of the tilt serve system is so designed that the dead zone (steady angular deviation) is minimum in order to prevent the cross talk recognized on the picture; and for the purpose of stabilization of the tilt servo system, the bandwidth is very low and the response speed is also low. Therefore, the stability of the tilt servo at the end of the search operation and that of the tilt servo in the ordinary play operation are not compatible with each other.

SUMMARY OF THE INVENTION

Accordingly, an object of this invention is to provide a tilt servo device which operates stably both during a search operation and during the play operation.

The foregoing object of the invention has been achieved by the provision of a tilt servo device comprising, a tilt adjustment mechanism for adjusting the relative position of a pickup and a disk included in a performance section according to a tilt drive signal and feedback means for feeding back, as the tilt drive signal, to the tilt adjustment mechanism a signal which represents a deviation of the optical axis of a read light beam outputted by the pickup from the state that the optical axis of the read light beam is perpendicular to the recording surface of the disk, in which, according to the invention the transfer frequency characteristic of the feedback means is larger in bandwidth in a search operation mode than in a play operation mode.

The novel features which are believed to be characteristic of the present invention, both as to its organization and as to its methods of operation, together with further objectives and advantages thereof will be better understood from the following description, considered in connection with the accompanying drawings, in which presently preferred embodiments of the invention are illustrated by way of example. It is expressly understood, however, that the description of the preferred embodiments and drawings are for the purpose of illustration and description only and are not intended as a definition of the limits of the invention.

DETAILED DESCRIPTION OF THE PREFERRED EMBODIMENTS OF THE INVENTION

One embodiment of this invention will be described with reference to FIG. 1.

Figure 1:
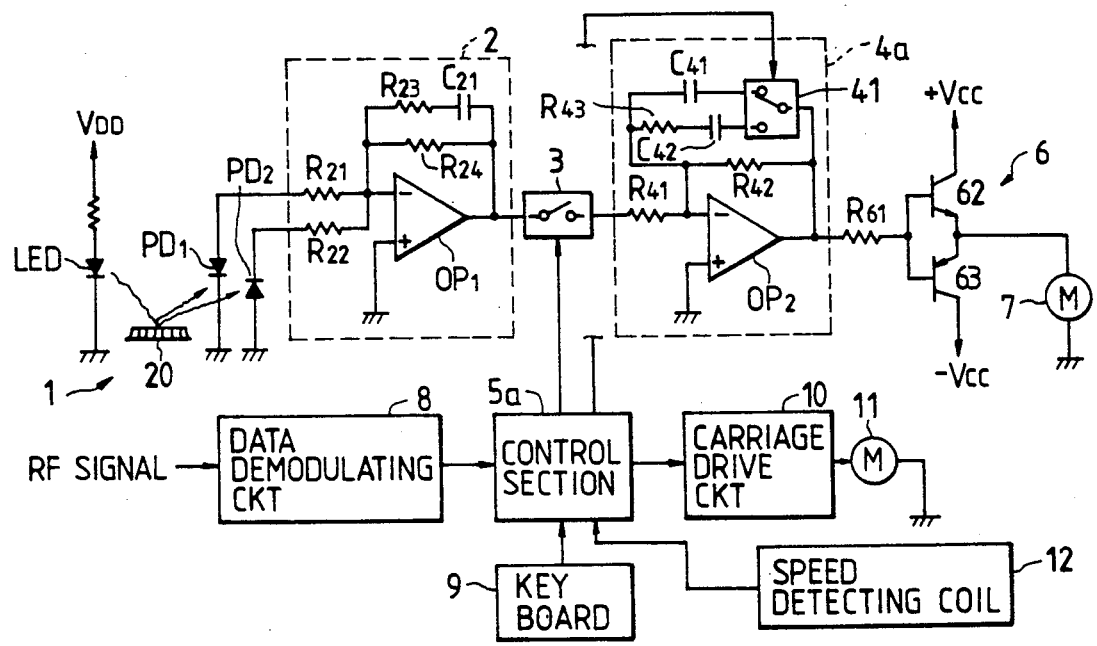
FIG. 1 is a circuit diagram, partly as a block diagram, showing one example of a tilt servo device according to the invention.
Figure 4:
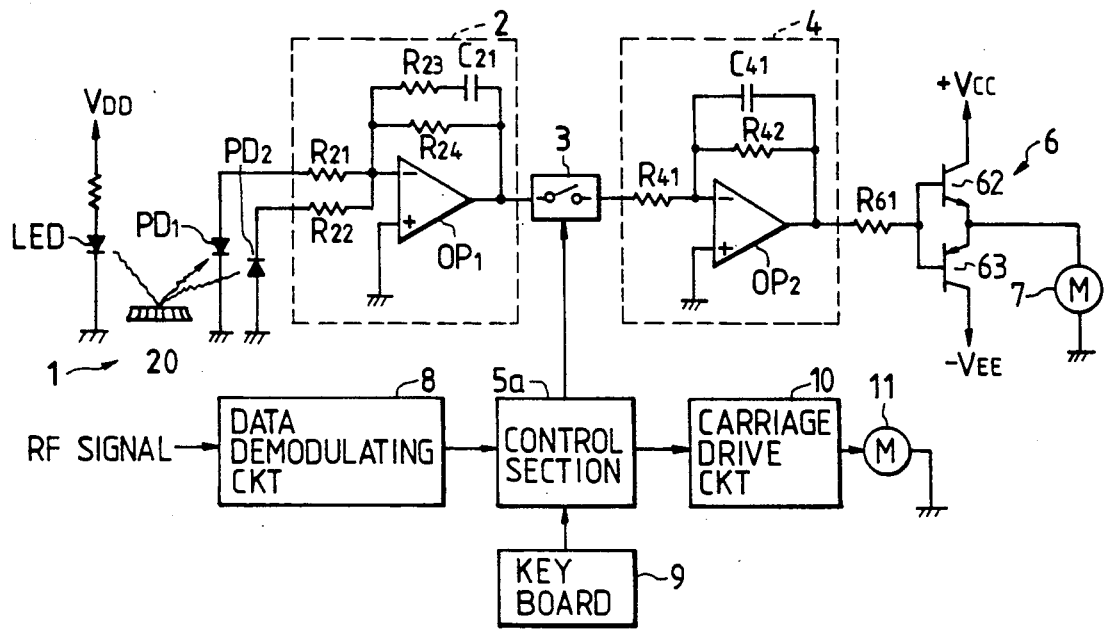
FIG. 4 is a circuit diagram partly as a block diagram, showing a related tilt servo device.
Figure 5:
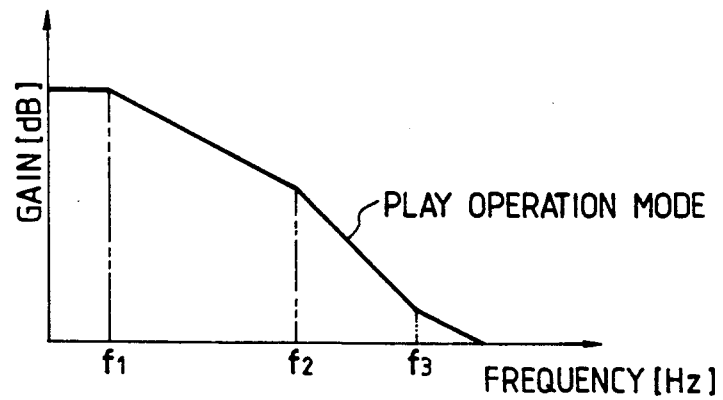
FIG. 5 is a graphical representation for a description of the transfer frequency characteristic of the tilt servo device shown in FIG. 4.

In FIG. 1, circuit elements corresponding functionally to those already described with reference to FIG. 4 are designated by the same reference numerals or characters.

As shown in FIG. 1, in the feedback impedance circuit of an equalizer amplifier 4a a selecting switch 41 comprising a changeover switch is provided, so that the series circuit of a resistor $R_{43}$ and a capacitor $C_{42}$, or a capacitor $C_{41}$ is selectively connected in parallel to a resistor $R_{42}$.

The carriage drive motor 11 is for instance a linear motor which is excellent with respect to a linear response characteristic. The moving element of the motor is detected with a speed detecting coil 12 coupled to the pickup carriage to control the speed of the motor. A control section 5a detects when a speed signal representing the speed of the moving element of the motor is at a predetermined level or higher thereby to detect a search operation mode. The pickup carriage may alternatively be driven with a rotary motor and a worm gear. In this case, a signal representing the speed of the rotary motor may be obtained with conventional means in order to detect the search operation mode. In addition, if, in the control section 5a, a flag representing the fact that the device is in search operation is set in the program, then the search operation mode can be detected as long as the flag exists. The control section 5a is equal to the control section 5 in the related tilt servo device described with reference to FIG. 4 except that it provides the additional output for driving the selecting switch 41 and has a search operation mode detecting function.

In operation, upon reception of a search instruction from the key board 9 the control section 5a operates the selecting switch 41 to connect the series circuit of the resistor $R_{43}$ and the capacitor $C_{42}$ in parallel with the resistor $R_{42}$, and then carries out the search operation mode in the same manner as in the conventional device.

Figure 2:
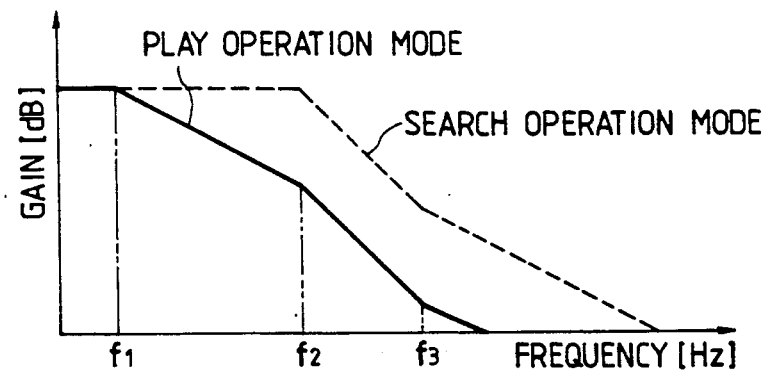
FIG. 2 is a graphical representation of a description of the transfer frequency characteristic of the embodiment shown in FIG. 1.

In this case, the total transfer frequency characteristic of the equalizer amplifiers 2 and 4a is as indicated by the dotted line in FIG. 2; that is, it is of wide bandwidth, thus improving the response characteristic of the tilt servo loop.

In an operation mode other than the search operation mode, such as a play mode or still picture reproduction mode, only the capacitor $C_{41}$ is connected in parallel to the resistor $R_{42}$. In this case, the total transfer frequency characteristic is of narrow bandwidth as indicated by the solid line in FIG. 2, thus ensuring the stability of the system.

As was described above, in the tilt servo device of the invention, the transfer characteristic of the feedback circuit in the tilt servo system is changed according to the operation mode of the disk player, so that a suitable loop characteristic is selected for the tilt servo system.

Figure 3A:
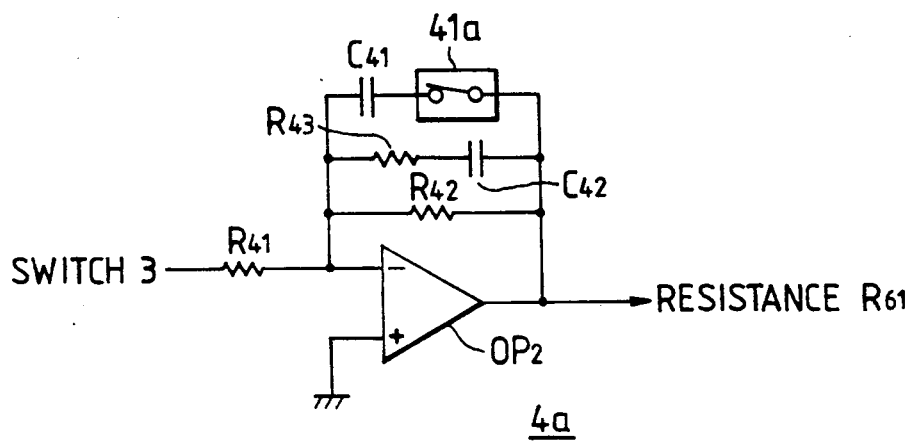
FIGS. 3(A) and (B) are circuit diagrams, partly as block diagrams, showing modifications of an equalizer amplifier (4a) in the tilt servo device shown in FIG. 1.
Figure 3B:
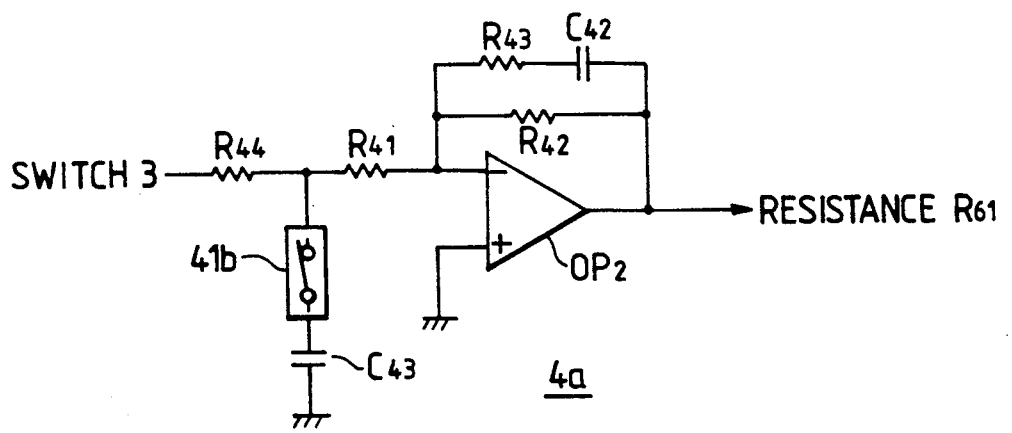

The parts (A) and (B) of FIG. 3 shows modifications of the equalizer amplifier 4a, in which parts corresponding functionally to those which have been already described with reference to FIG. 1 are designated by the same reference numerals or characters.

In the equalizer amplifier 4a shown in the part (A) of FIG. 3, a selecting switch 41a which is a normally closed switch is connected in series with respect to the capacitor $C_{41}$.

In the search operation mode, the control section 5a opens the selecting switch 41a so as to provide a wide bandwidth transfer characteristic for the equalizer amplifier 4a; and in the play operation mode, it closes the selecting switch 41a to provide a narrow bandwidth transfer characteristic.

In the equalizer amplifier 4a shown in the part (B) of FIG. 3 a resistor $R_{44}$ is connected in series with respect to the resistor $R_{41}$ in the input circuit thereof and the connecting point of the resistors $R_{41}$ and $R_{44}$ is grounded through a series circuit of a capacitor $C_{43}$ and a selecting switch 41b which is a normally closed switch. The selecting switch 41b is controlled by the control section 5a.

In the search operation mode the control section 5a opens the selecting switch 41b; and in the play operation mode, it closes the selecting switch 41b. When the selecting switch 41b is closed the resistor $R_{44}$ and the capacitor $C_{43}$ functions as a low-pass filter (LPF). Therefore, in the search operation mode, the equalizer amplifier shows a wide bandwidth transfer characteristic and in the play operation mode, it shows a narrow bandwidth transfer characteristic.

In one of the above-described equalizer amplifier embodiments, the bandwidth constant of the feedback impedance circuit is changed, and in the other, the bandwidth constant of the input circuit is changed.

As a further alternative, at least two equalizer amplifiers, each of which is different in transfer characteristic, may be employed in such a manner that they are selectively used. That is, what is required, in this case, is to make it possible to change the bandwidth characteristic of the feedback circuit.

As was described above in the tilt servo device according to the invention, in the search operation mode, the transfer frequency characteristic of the feedback circuit for controlling the tilt adjustment mechanism is changed into a wide bandwidth transfer characteristic, and in the play operation mode it is changed into a narrow bandwidth transfer characteristic. Therefore with the tilt servo device of the invention, not only the stable operation of the tilt servo system is ensured in the play operation mode or in the still picture reproduction mode but also the convergence of the search operation is positively achieved. As a result, the time required for completing a series of operations from the search operation to the performance is reduced. In addition, the technical concept of the invention can be preferably applied to an optical disk player in which, for high speed access, a linear motor is employed as the pickup carriage motor. In this case, the search operation is achieved more quickly.

Although a particular embodiment of the invention has been described and illustrated herein, it is recognized that many modifications and variations not discussed herein may readily occur to those skilled in the art, and consequently, it is intended that the claims be interpreted to cover such modifications and equivalents.

What is claimed is:

1. An optical disk player operating in at least a search operation mode and a play operation mode, said optical disk player having tilt servo means comprising:
   tilt adjustment means for adjusting a relative position of pickup means and a disk according to a tilt drive signal; and
   feedback means for feeding back, as said tilt drive signal to said tilt adjustment means, a signal which represents a deviation of an optical axis of a read light beam, outputted by said pickup means, from a state where the optical axis of said read light beam is perpendicular to the recording surface of said disk;
   wherein a transfer frequency characteristic of said feedback means is wider in bandwidth in the search operation mode than in the play operation mode.

2. An optical disk player as claimed in claim 1, wherein said feedback means comprises:
   detecting means for detecting when a search operation mode is being performed by said player, and for providing a search operation mode detection signal in response thereto; and
   feedback circuit means for switching said transfer frequency characteristic from a first transfer frequency characteristic over to a wider bandwidth transfer frequency characteristic according to said search operation mode detection signal.

3. An optical disk player as claimed in claim 2:
   wherein said feedback means comprises an operational amplifier means; and
   wherein said feedback circuit means comprises a selectable feedback circuit connected between an output terminal and an input terminal of said operational amplifier means, said selectable feedback circuit being selectable to a first feedback circuit configuration for causing said feedback circuit means to operate according to said first transfer frequency characteristic, and being selectable to a second feedback circuit configuration for causing said feedback circuit means to operate according to said wider bandwidth transfer frequency characteristic.

4. An optical disk player as claimed in claim 3:
   wherein the transfer frequency characteristic of said feedback means operates with a bandwidth in a range of 0 Hz. to 0.5 Hz. while in the play operation mode, and operates with a bandwidth in a range of 0 Hz. to 10 Hz. while in the search operation mode.

5. An optical disk player as claimed in claim 2:
   wherein said feedback means comprises an operational amplifier means; and
   wherein said feedback circuit means comprises a selectable input circuit connected to an input terminal of said operational amplifier means, said selectable input circuit being selectable to a first input circuit configuration for causing said feedback circuit means to operate according to said first transfer frequency characteristic, and being selectable to a second input circuit configuration for causing said feedback circuit means to operate according to said wider bandwidth transfer frequency characteristic.

6. An optical disk player as claimed in claim 5:

wherein the transfer frequency characteristic of said feedback means operates with a bandwidth in a range of 0 Hz. to 0.5 Hz. while in the play operation mode, and operates with a bandwidth in a range of 0 Hz. to 10 Hz. while in the search operation mode.

7. An optical disk player as claimed in claim 2:
wherein said feedback means being selectable to a first operational amplifier arrangement for causing said feedback circuit means to operate according to said first transfer frequency characteristic, and being selectable to a second operational amplifier arrangement for causing said feedback circuit means to operate according to said wider bandwidth transfer frequency characteristic.

8. An optical disk player as claimed in claim 7:
wherein the transfer frequency characteristic of said feedback means operates with a bandwidth in a range of 0 Hz. to 0.5 Hz. while in the play operation mode, and operates with a bandwidth in a range of 0 Hz. to 10 Hz. while in the search operation mode.

* * * * *